United States Patent [19]
Jackel et al.

[11] Patent Number: 5,034,950
[45] Date of Patent: Jul. 23, 1991

[54] NON-LINEAR ISOLATOR BASED ON STIMULATED BRILLOUIN SCATTERING FOR A LASER APPARATUS

[75] Inventors: Steven M. Jackel, Rehovot; Raphael Lallouz, Ashdod, both of Israel

[73] Assignee: The State of Israel, Atomic Energy Commission, Soreq Nuclear Research Center, Yavne, Israel

[21] Appl. No.: 491,179

[22] Filed: May 9, 1990

[30] Foreign Application Priority Data

Mar. 17, 1989 [IL] Israel ............................................. 89653

[51] Int. Cl.$^5$ .............................................. H01S 3/10
[52] U.S. Cl. .................................... 372/21; 372/9; 372/703; 372/98; 372/106
[58] Field of Search ................... 372/27, 98, 19, 9, 106, 372/703

[56] References Cited

U.S. PATENT DOCUMENTS

| | | | |
|---|---|---|---|
| 4,575,849 | 3/1986 | Chun | 372/9 |
| 4,698,816 | 10/1987 | Chun | 372/19 |
| 4,725,787 | 2/1988 | Chandra | 372/27 |

*Primary Examiner*—Léon Scott, Jr.
*Attorney, Agent, or Firm*—Helfgott & Karas

[57] ABSTRACT

A laser application system comprises an amplifier and two rotating polarization devices so that a laser beam is given with linear polarization which is converted into a circular polarization. Then the beam passing through amplifier means, is reflected into a second pass and reflected back to the amplifier. The system further includes a stimulated Brillouin scattering non-linear isolator for transmitting substantially all of the light beam when its energy is below a predetermined threshold and reflecting substantially all of the light beam without substantially reducing the quality of the beam, when its energy exceeds the threshold.

11 Claims, 1 Drawing Sheet

NON-LINEAR ISOLATOR BASED ON STIMULATED BRILLOUIN SCATTERING FOR A LASER APPARATUS

FIELD OF THE INVENTION

This invention relates to an isolator for a laser apparatus.

BACKGROUND OF THE INVENTION

In certain types of laser apparatus, for example multipass and regenerative amplifiers, there is provided at least one stage of amplification through which a laser beam is passed two or more times. In such systems, energy is injected from an oscillator or a previous amplifier stage. As the laser beam propagates through the amplifying medium, its energy is increased by an amount equal to the instantaneous single pass gain. Eventually, if enough passes are encountered, the energy of the resultant laser beam may approach the damage threshold within the laser apparatus itself. Back reflections from any source may also cause severe damage. For example, damage may be caused to the optics in front of the multi-pass or regenerative amplifier by the leakage of light through the injection optics and back towards the previous amplifier stages and/or towards the oscillator. Furthermore, light back reflected from targets irradiated by the laser beam may also cause damage if allowed to propagate too far back through the laser system.

In order to provide the required protection, it is known to provide isolators within the laser apparatus which allow one way passage of light.

Commonly used active devices for achieving this objective include Pockels cells which work on the electro-optic effect and Faraday rotators which employ the magneto-optic effect. In the Pockels cell, phase changes are produced in polarised light passing through a crystal made birefringent by means of stresses induced by an external electric field. By adjusting the field strength, it is possible, when desired, to rotate the plane of polarisation of the light emerging from the Pockels cell such that the polariser reflects most of the laser light out of the apparatus rather than transmitting it to subsequent optical components.

In this respect, Pockels cells or Faraday rotators can act as fast shutters or as one way light valves for controlling the propagation of laser light. However, complex electronics must be employed for controlling the Pockels cell or Faraday rotator in order that it will be able to rotate the plane of polarisation of laser light passing therethrough to the required degree and, for a Pockels cell, at the required time.

Quarter-wavelength plates (or Rhomb prisms) may also be employed in conjunction with polarisers for rotating the polarisation plane of linearly polarised light so as to extract it from double passed laser apparatus by means of the polariser.

There exists an inherent drawback in devices which rely on the relative retardation between the field vectors of the polarised light passing therethrough, in that they are not 100% efficient. Consequently, a fraction of the laser light may remain within the laser apparatus and the energy of this fraction may be sufficiently high to cause damage. This problem may be exacerbated when spurious polarisation changes occur within the laser apparatus.

Such polarisation changes may be caused, for instance, on account of the fact that the flashlamps which are used for pumping the laser are inefficient and much of the flashlamp energy is lost as heat in the laser medium itself. To prevent the heat from damaging the laser medium, the laser medium is externally cooled and so there obtains a lateral temperature gradient through the medium whereby it is hotter along its centre than around its periphery. The temperature differential thus obtained causes thermal stresses to be generated within the medium which vary spatially along its thickness. This, in turn, produces birefringence whereby the refractive index across the thickness of the medium varies according to the polarisation plane of the laser light.

As a result, when such a laser medium is interposed between a retro-reflecting surface and a $\frac{1}{4}$-wavelength plate plus polariser, the retro-reflected light extracted from the $\frac{1}{4}$-wavelength plate will not be rotated by exactly 90° and this produces both losses and, more importantly, creates leakage through the polariser. This leakage may be sufficient to damage the oscillator or other components between the oscillator and the multi-pass or regenerative amplifier.

Various alternative isolators and optical power limiters have been suggested in the literature. For example, Natarov et al. in Sov. J. Quantum Electron. 14(6), June 1984, page 871, describe a "specific configuration of a four-pass laser amplifier with a stimulated Brillouin scattering mirror". The stimulated Brillouin scattering (SBS) mirror is a threshold device which transmits light whose intensity is below a predetermined threshold but reflects light when its intensity exceeds that threshold. In the system disclosed by Natarov et al., an SBS mirror is employed which transmits unfocused subthreshold intensity laser light produced by a suitable oscillator and transmitted through a conventional isolation device. The beam is amplified in a laser rod, retro-reflected by a concave mirror and re-amplified by the laser rod. The focus of the concave mirror is adjusted to be within the SBS cell. On encountering the SBS medium a second time, the focused and twice amplified beam is partially retro-reflected towards the amplifier rod and the beam retraces its path through the system. The light propagates through the SBS cell a final time and is fully transmitted because, although now amplified four times, it is unfocused. The conventional isolator then extracts the beam and prevents it from reaching the oscillator. Natarov et al. show that the maximum reflection coefficient of the focused beam in the SBS mirror is approximately 60% and its transmission is consequently 40% even when the beam's energy exceeds the threshold. Consequently, the SBS medium employed by Natarov et al. is used only as a mirror and never as an isolator.

M. J. Soileau et al., in IEEE Journal of Quantum Electronics, Vol. QE-19, No. 4, April 1983, describe an optical power limiter for use with a mode-locked Nd:YAG laser employing the self-focusing non-linear refraction characteristics associated with liquids which may or may not exhibit stimulated Brillouin scattering. Such an arrangement permits a laser beam to pass through the isolating medium such that its output is so de-focused as to be incapable of causing optical breakdown. In this respect, it is not truly an "isolator" and is not suitable for use in laser amplification devices from which it is desired to extract a high energy, good optical quality laser beam whilst, at the same time, preventing consequent damage to neighbouring components.

Likewise, Thomas F. Boggess, Jr. et al. ("Optical Limiting in GaAs", IEEE Journal of Quantum Electronics, Vol. QE-21, No. 5, May 1985) discuss a non-linear optical limiter for protecting sensitive optical components from high-power laser radiation and optical transients. The optical limiter described by Boggess et al. is similar, in principle, to that described by Soileau above and employs non-linear self-focusing through the non-linear medium in order to increase the effective aperture of the output beam and to reduce its intensity accordingly.

The optical limiting devices disclosed by both Soileau and Boggess are essentially the optical equivalents of a Zener diode and can be used as such to smooth intense optical transients. Thus, whilst acting as effective optical limiters, they do nevertheless permit a predetermined fraction of the input beam to pass therethrough. Preferably, an ideal optical isolator would substantially reduce the intensity of a laser beam whose power exceeded a predetermined threshold.

SUMMARY OF THE INVENTION

It is an object of the invention to provide a non-linear isolator based on stimulated Brillouin scattering, in which the drawbacks associated with hitherto proposed systems are substantially reduced or eliminated.

According to a first aspect of the invention there is provided a laser amplification system, comprising:

an oscillator for generating a beam of laser light which is linearly polarised in a first direction, first polarisation rotation means for intercepting the oscillator beam and converting it from linear to circular polarisation, second polarisation rotation means for intercepting said circularly polarised beam and converting it to linearly polarised light whose plane of polarisation is in a second direction orthogonal to said first direction, an amplifier disposed either side of said second polarisation rotation means for amplifying the laser beam, reflecting means for intercepting the amplified beam and reflecting it so that it passes back through the amplifier;

a stimulated Brillouin scattering non-linear isolator disposed adjacent to the first polarisation rotation element remote from the oscillator so as to intercept said circularly polarised beam and transmit substantially all of the beam when its energy is below a predetermined threshold and reflect substantially all of the beam when its energy exceeds said threshold, and a polarising element disposed so as to intercept said amplified beam when reflected by the non-linear isolator;

said amplifier being so adapted that after at least one pass therethrough the energy of the beam exceeds said threshold.

According to a second aspect of the invention there is provided, in an optical apparatus susceptible to the propagation therethrough of a beam of laser light, the improvement whereby there is provided a stimulated Brillouin scattering non-linear isolator for transmitting substantially all of said light when its energy is below a predetermined threshold and reflecting substantially all of said light when its energy exceeds said threshold.

Thus, an optical isolator in accordance with the invention provides a simple passive device which requires no complicated electronics control equipment (such as required for Pockels cells or Faraday rotators) and which transmits as little as 0.01% of the incident light when the power threshold is exceeded.

BRIEF DESCRIPTION OF THE DRAWINGS

The invention will now be described, by way of non-limiting example only, with regard to a multi-pass laser or a regenerative amplifier and with reference to the accompanying drawings, in which.

DETAILED DESCRIPTION OF PREFERRED EMBODIMENTS

Figure 1:
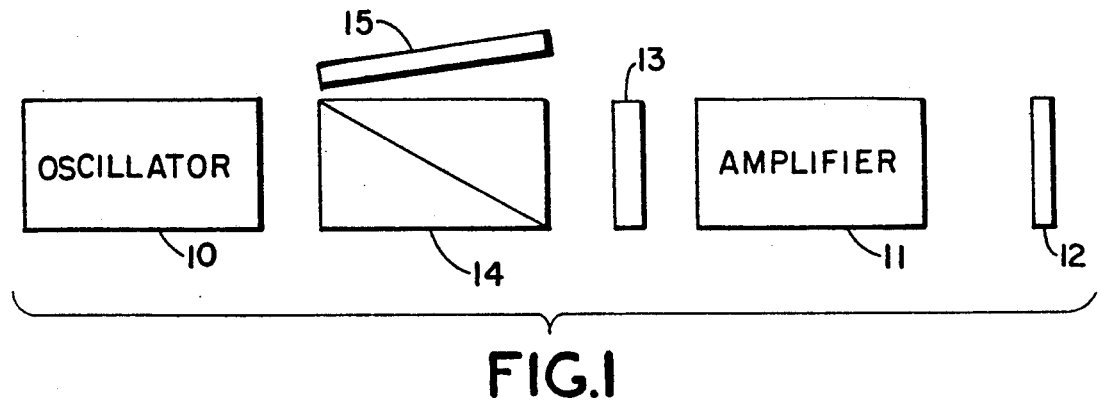
FIG. 1 is a schematic diagram of a known multi-pass amplifier.

Referring to FIG. 1, there is shown a typical, prior art multi-pass amplifier, including an oscillator section 10, at least one amplifier stage 11 and a 0° phase-conjugate mirror 12. The oscillator 10 generates a beam of laser light which is amplified by the amplifier 11 and partially or completely reflected by the mirror 12 whence it may either be extracted from the amplifier (as in a single-pass amplifier) or, alternatively, passed through the amplifier one or more times prior to extraction. In FIG. 1, there are disposed a ¼-wavelength plate 13 and a polariser 14 between the amplifier 11 and the oscillator 10. The oscillator 10 generates a beam of linearly polarised light whose plane of polarisation is such that it is transmitted by the polariser 14 towards the ¼-wavelength plate 13. In passing through the ¼-wavelength plate 13, one component of the laser beam is retarded such that what emerges from the ¼-wavelength plate 13 is a beam of circularly polarised light.

Consequently, although the oscillator generates linearly polarised light, the beam which is amplified by the amplifier 11 is circularly polarised. The amplified beam is adapted to strike the mirror 12 normally and is therefore reflected back on itself through the amplifier 11 from which it emerges as a further amplified beam of circularly polarised light. This amplified beam is now transmitted through the ¼-wavelength plate 13 from which it emerges as linearly polarised light whose plane of polarisation is orthogonal to that of the original oscillator beam. Consequently, on striking the polariser 14, it is no longer transmitted but is reflected out of the system.

Such an arrangement is a two-pass amplifier, but a three-pass amplifier may be constructed by means of the addition of a further mirror 15 disposed adjacent to the polariser 14 and at a small angle thereto (typically half a degree) so as to intercept the output beam. With the provision of such a mirror 15, the output beam is reflected back into the system through the polariser and through the ¼-wavelength plate 13 which again converts the beam to a circularly polarised beam which is amplified a third time by the amplifier 11.

However, since the original output beam was reintroduced into the system at a slight angle by means of the mirror 15, the beam emerging from the amplifier 11 will no longer be normal to the mirror 12 but will be offset from the normal by a small angle. By arranging the distance between the amplifier 11 and the mirror 12 to be sufficiently large, it may be arranged that the beam emerging from the amplifier 11 will not strike the mirror 12 but will emerge from the system.

In order to understand the invention better, and to appreciate its advantages over the prior art, it is necessary to indicate several major drawbacks with the arrangement described above with reference to FIG. 1 of the drawings. When employed as a three-pass amplifier incorporating the output mirror 15, the distance between the amplifier 11 and the mirror 12 must be significantly increased in order to extract the amplified beam from the amplifier.

A further drawback is the added angular instability introduced by the conventional output mirror. For a conventional mirror, wherein Snell's Law of Reflection is obeyed such that the angle of reflection equals the angle of incidence, a slight misalignment of the mirror 15 with respect to the optical axis of the amplifier 11 results in a doubled beam deflection. As a result, very critical alignment is required and any slight misalignment is a source of instability.

Additionally, and as explained above, the beam emerging from the amplifier undergoes polarisation variation on account of the birefringence in the lasing medium of the amplifier caused by the thermal gradient which is established as a result of the cooling. Consequently, the beam emerging from the amplifier and striking the ¼-wavelength plate 13 is rotated non-uniformly so as to emerge from the ¼-wavelength plate 13 with non-uniform elliptical, as opposed to linear, polarisation. It is therefore impossible to arrange that the polariser 14 plus ¼-wavelength plate may reflect completely the amplified beam out of the system.

On account of this drawback, part of the amplified beam will be transmitted through the polariser 14 towards the oscillator 10. It may happen that the amplification is sufficiently great and the depolarisation of the output beam also sufficiently large, that the component of the output beam transmitted back towards the oscillator 10 has sufficient power to damage the oscillator 10.

It should be understood that the 0° phase-conjugate mirror 12 may equally well be substituted by a conventional 0° mirror. Alternatively, any source of stray reflections may be substituted.

Figure 2:
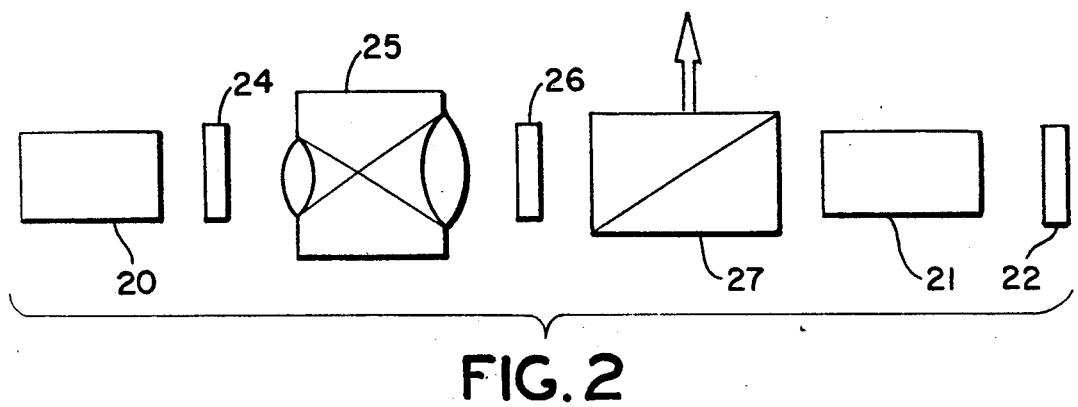
FIG. 2 is a schematic diagram of a two-pass amplifier or of a regenerative amplifier in accordance with the invention.

Referring now to FIG. 2 there is shown an improved two-pass or regenerative amplifier in accordance with the invention, which overcomes the depolarisation drawback described above.

Thus, FIG. 2 shows an oscillator 20, an amplifier stage 21 and a 0° reflecting conventional or phase-conjugate mirror 22. Disposed adjacent to the oscillator 20 is a ¼-wavelength plate 24 for converting the oscillator beam from linearly to circularly polarised light. The low energy, circularly polarised beam emerging from the ¼-wavelength plate 24 is passed at subthreshold intensity, through a non-linear isolator 25 which consists of a Newtonian telescope filled with a material susceptible to stimulated Brillouin scatter. The beam emerging from the non-linear isolator 25 remains circularly polarised and is passed through a ¼-wavelength plate 26 which converts it back to linearly polarised light having a plane of polarisation orthogonal to that of the original oscillator beam.

The laser beam emerging from the ¼-wavelength plate 26 is passed through a polariser 27 which is so arranged as to transmit the incoming beam towards the amplifier 21. The amplified beam strikes the 0° mirror 22 normally and so is reflected back on itself towards the amplifier, wherein it is amplified a second time. The re-amplified beam may have suffered some depolarisation owing to the temperature gradient effect induced in the laser medium of the amplifier 21 and therefore a small component of the reamplified beam may be reflected by the polariser 27 out of the system. However, from the point of view of the invention, this loss may be ignored.

The beam emerging from the polariser 27 is plane polarised and enters the ¼-wavelength plate 26 from which it emerges as a beam of circularly polarised light which has been so amplified that its threshold exceeds the energy threshold of the non-linear isolator 25. Consequently, the beam striking the non-linear isolator 25 is reflected thereby through the ¼-wavelength plate 26 from which it emerges as a beam of linearly polarised light whose plane of polarisation is now such that it is reflected by the polariser 27 out of the system.

The non-linear isolator 25 functions independently of the polarisation of the light striking it when the light intensity is below or substantially above the threshold. Consequently, its capacity to transmit or reflect incident light is dependent only on the energy threshold of the light. Additionally, the slight depolarisation associated with the amplifier 21 (and resulting in possible damage to the oscillator 10 in FIG. 1) does not affect the operation of the non-linear isolator 25, which reflects substantially all of the light falling thereupon when its energy exceeds the threshold of the non-linear isolator 25. Consequently, the light passing through the non-linear isolator 25 towards the oscillator 20 is negligible and no damage to the oscillator obtains.

Figure 3:
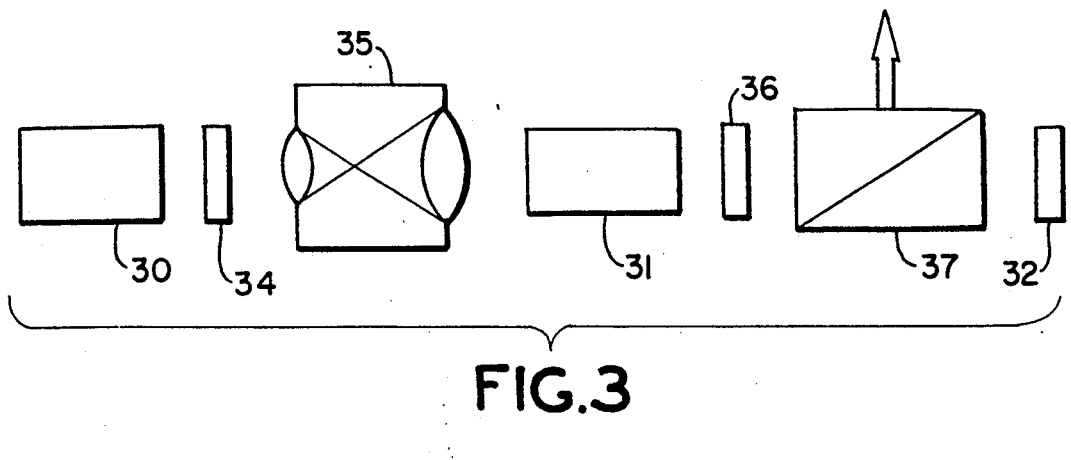
FIG. 3 is a schematic diagram of a three-pass amplifier or of a regenerative amplifier in accordance with the invention.

Referring now to FIG. 3 of the drawings, there is shown a modification of the system described above with reference to FIG. 2, wherein a laser beam is adapted to be amplified three times prior to being extracted from the system. The arrangement shown in FIG. 3 includes an oscillator 30, an amplifier 31 and a 0° reflecting conventional or phase-conjugate mirror 32. Disposed adjacent to the oscillator 30 is a ¼-wavelength plate 34 which changes the polarisation of the laser beam emerging from the oscillator 30 from linear to circular. Disposed between the amplifier 31 and the 0° mirror 32 are a second ¼-wavelength plate 36 and a polariser 37.

The operation of the system is as follows. The oscillator 30 generates a low energy beam of linearly polarised laser light which passes through the first ¼-wavelength plate 34 and emerges as a circularly polarised beam. The circularly polarised beam passes through the non-linear isolator 35 since its energy is lower than the energy threshold of the non-linear isolator 35. Consequently, the non-linear isolator 35 transmits substantially all of the incoming beam and the emerging beam passes through the amplifier 31 from which it emerges as an amplified beam. The amplified beam passes through the second ¼-wavelength plate 36, which changes its polarisation from circular to linear, its polarisation plane being orthogonal to that of the original oscillator beam. The relative orientation between the second ¼-wavelength plate 36 and the polariser 37 is such that the linearly polarised beam emerging from the second ¼-wavelength plate 36 passes through the polariser 37 and strikes the 0° mirror 32.

It is arranged that the beam emerging from the polariser 37 strikes the 0° mirror 32 normally and so is reflected on itself back through the polariser 37 towards the second ¼-wavelength plate 36. It emerges therefrom as a circularly polarised beam which is amplified by the amplifier 31 from which it propagates towards the non-linear isolator 35.

The gain of the amplifier 31 is such that the original, low energy oscillator beam has sufficient energy after being amplified by the amplifier 31 that its energy exceeds the energy threshold of the non-linear isolator 35. Whether this transformation occurs after a single pass through the amplifier 31, or after the two passes described above, does not affect the subsequent performance of the apparatus so long as the beam which emerges from the amplifier 31 after two passes therethrough exceeds the energy threshold of the non-linear isolator 35.

Under these circumstances, the beam emerging from the amplifier 31 towards the non-linear isolator 35 is substantially reflected by the non-linear isolator 35 back towards the amplifier 31. The beam emerging therefrom has now been amplified three times and on passing through the second ¼-wavelength plate 36 undergoes another change of polarisation from circular to linear. This time, however, its plane of polarisation is such that the polariser reflects substantially all of the amplified beam out of the system. Any light which has leaked through the polariser 37 on account of depolarisation makes another round trip through the amplifier 31 and is again substantially reflected by the non-linear isolator 35 and subsequently reflected by the polariser 37 out of the system. Thus, in this configuration, not only is isolation improved by means of the non-linear isolator, but laser energy losses due to birefringence are also significantly reduced.

It will be understood that in order to convert the double- or triple-pass amplifiers shown, respectively, in FIGS. 2 and 3 into regenerative amplifiers, the ¼-wavelength plates 26 and 36 are rotated so as produce only partial reflection of the beam from the polarisers 27 and 37. The remaining energy is recirculated for further amplification until the energy stored within the laser medium is depleted.

In the embodiments described above with reference to FIGS. 2 and 3 of the drawings, the 0° mirrors 22 and 32, respectively, are preferably provided in the form of phase-conjugate mirrors. Such mirrors do not operate in accordance with Snell's Law of Reflection which applies to conventional mirrors, but, rather, retroflect the light rays along the incident propagation axis of the. Consequently, any misalignment of the mirror with respect to the optical axis of the amplifier has no effect on the path of the laser beam since, regardless of the angle of incidence, it will be reflected back on itself through the amplifier along its original path. Since the alignment of the phase-conjugate mirror with the optical axis of the amplifier is no longer critical, the resulting multi-pass amplifier is more stable. When reflection occurs in the non-linear isolator, the light is reflected as in a phase-conjugate mirror.

In systems wherein phase conjugate reflections occur, as will always be the case for the non-linear isolator 25 or 35 and will additionally be the case when the 0° mirrors 12, 22 or 32 shown in FIGS. 2 and 3 are phase-conjugate mirrors, beam aberrations introduced by double-passed distorting elements may be reduced. Consequently, the optical quality of the reflected beam will be as least as good as that of the incident beam which strikes the SBS reflecting device.

It will therefore be understood that the non-linear isolators described with reference to FIGS. 2 and 3 above, isolate the respective oscillators from the amplified laser beam and thereby prevent irreversible damage to the oscillator. Whilst particular configurations for two- and three-pass amplifiers have been described, it will be understood that the non-linear isolator may be applied equally well, regardless of the specific configuration being employed. It should also be understood that the operation of the non-linear isolator, in accordance with the invention, relies on the substantially total transmittance through the non-linear isolator of laser light whose energy is below the energy threshold of the isolator, whilst reflecting substantially all of the laser light when its energy exceeds that threshold. This use of a non-linear isolator based on stimulated Brillouin scattering is quite different to that of optical limiters described in the prior art, which rely on self-focusing through the active medium so as to diffuse the light emerging therefrom. In contrast to this, the beam reflected by the non-linear isolator of the invention is of high optical quality.

It will also be appreciated that although the non-linear isolator has been described with regard to its isolating properties in a laser amplifier, it has more general application in optical systems which are susceptible to the propagation therethrough of laser light. For example, it may be used as a frequency-independent filter in combination with microscope/telescope sighting optics so that laser light reaching sensitive components and exceeding the energy threshold of the SBS medium is reduced in energy. This is in contrast to hitherto proposed systems (such as described by Natarov et al. above) where the intensity of the beam is reduced, by increasing its effective area, without altering its overall energy. The high energy beam is reflected back towards its source and is thus prevented from passing through the sighting optics and reaching the eyes of the user or the surface of a detector, thereby avoiding possible damage thereto.

We claim:
1. A laser amplification system, comprising:
   generating means for generating a beam of laser light which is linearly polarised in a first direction,
   first polarisation rotation means for intercepting said beam and converting it from a linearly polarised beam to a circularly polarised beam,
   second polarisation rotation means for intercepting said circularly polarised beam and converting it to linearly polarised light a plane of polarisation of which is in a second direction orthogonal to said first direction,
   an amplifier disposed at a side of said second polarisation rotation means for amplifying the laser beam,
   reflecting means for intercepting an amplified beam and reflecting it so that it passes back through the amplifier;
   a stimulated Brillouin scattering non-linear isolator disposed adjacent to the first polarisation rotation means remote from the generating means so as to intercept said circularly polarised beam and transmit substantially all of the beam when its energy is below a predetermined threshold and reflect substantially all of the beam when its energy exceeds said threshold, and
   a polarising element disposed so as to intercept said amplified beam when it is reflected by the non-linear isolator;
   said amplifier having a sufficiently high gain so that after at least one pass therethrough by the laser beam the energy of the beam exceeds said threshold.

2. A laser amplification system according to claim 1, wherein the polarising element is constructed so that it passes the beam when the beam is linearly polarised in said first direction and subsequently extracts the beam from the system when the beam is linearly polarised in said second direction.

3. A laser amplification system according to claim 1, wherein the reflecting means is constituted by a phase-conjugate mirror.

4. A laser amplification system according to claim 1, wherein the amplifier is disposed between the reflecting means and the polarising element and the second polarisation rotation means is disposed between the polarising element and the non-linear isolator so that said amplifier acts as a two-pass amplifier;

whereby after a first pass through the amplifier, the amplified beam is reflected by the reflecting means so as to make a second pass through the amplifier, polarising element and second polarisation rotation means, thereby striking the non-linear isolator which reflects the beam so as to pass through a further polarising element such that on striking the polarising element the beam is extracted.

5. A laser amplification system according to claim 1, wherein the amplifier is disposed between the non-linear isolator and the second polarisation rotation means and the polarising element is disposed between the second polarisation rotation means and the reflecting means so that said amplifier acts as a three-pass amplifier;

whereby after a first pass through the amplifier, the beam passes through the second polarisation rotation means and exits therefrom linearly polarised in said first direction so that it is passed by the polarising element and reflected by the reflecting means through the polarising element and the second polarisation rotation means whence it exits as the circularly polarised beam and passes a second time through the amplifier to be reflected by the non-linear isolator and pass a third time through the amplifier and the second polarisation rotation means whence it exits as the linearly polarised beam in said second direction and is extracted by the polarising element.

6. A laser amplification system according to claim 1, wherein the amplifier is a regenerative laser amplifier and the second polarisation rotation means is adjusted so as to extract only a portion of the amplified beam and to allow the remainder of the amplified beam to be further amplified, the extraction and reamplification being repeated until a large proportion of an energy stored in a laser medium is extracted.

7. A laser amplification system according to claim 1, wherein said first polarisation rotation means is constituted by a ¼-wavelength plate.

8. A laser amplification system according to claim 1, wherein said second polarisation rotation means is constituted by a ¼-wavelength plate.

9. In an optical apparatus susceptible to the propagation therethrough of a beam of laser light, the improvement whereby there is provided a stimulated Brillouin scattering non-linear isolator for transmitting substantially all of said light when its energy is below a predetermined threshold and reflecting substantially all of said light without substantially reducing the quality of the beam, when its energy exceeds said threshold.

10. The apparatus according to claim 9 further including a polarising element for extracting a predetermined proportion of said beam from said apparatus, and to reflect the beam towards its source.

11. An optical apparatus according to claim 9 including sighting optics, wherein said non-linear isolator is disposed within the apparatus so as to prevent propagation through the sighting optics of said laser beam when its energy exceeds said threshold.

* * * * *

UNITED STATES PATENT AND TRADEMARK OFFICE
CERTIFICATE OF CORRECTION

PATENT NO. : 5,034,950

DATED : July 23, 1991

INVENTOR(S) : Steven M. Jackel, Raphael Lallouz

It is certified that error appears in the above-identified patent and that said Letters Patent is hereby corrected as shown below:

On the title page change to read as follows:

--[22] Filed March 9, 1990--

Signed and Sealed this

Fifth Day of January, 1993

Attest:

DOUGLAS B. COMER

Attesting Officer

Acting Commissioner of Patents and Trademarks